(12) United States Patent
Takimoto et al.

(10) Patent No.: US 7,909,515 B2
(45) Date of Patent: Mar. 22, 2011

(54) DOUBLE ROW BALL BEARING AND DIFFERENTIAL GEAR DEVICE

(75) Inventors: Atsushi Takimoto, Kashiwara (JP); Youzou Taniguchi, Toyota (JP)

(73) Assignee: Jtekt Corporation, Osaka-shi, Osaka (JP)

( * ) Notice: Subject to any disclaimer, the term of this patent is extended or adjusted under 35 U.S.C. 154(b) by 429 days.

(21) Appl. No.: 12/076,937

(22) Filed: Mar. 25, 2008

(65) Prior Publication Data

US 2008/0240639 A1 Oct. 2, 2008

(30) Foreign Application Priority Data

Mar. 26, 2007 (JP) .............................. P2007-078308

(51) Int. Cl.
*F16C 19/08* (2006.01)

(52) U.S. Cl. ...................................... 384/504; 384/516

(58) Field of Classification Search .................. 384/504, 384/512, 513, 516
See application file for complete search history.

(56) References Cited

U.S. PATENT DOCUMENTS

| 1,645,345 | A * | 10/1927 | Okner | ........................... 384/497 |
| 6,769,809 | B2 * | 8/2004 | Maret | ........................... 384/512 |
| 6,957,919 | B2 * | 10/2005 | Kern et al. | ..................... 384/526 |
| 2007/0196037 | A1 * | 8/2007 | Fukuda et al. | ................. 384/512 |

FOREIGN PATENT DOCUMENTS

| JP | 2006-234100 | | 9/2006 |
| WO | WO 2005088144 | A1 * | 9/2005 |

* cited by examiner

*Primary Examiner* — Thomas R Hannon
(74) *Attorney, Agent, or Firm* — McGinn IP Law Group, PLLC

(57) ABSTRACT

The difference between a revolution period of larger diameter-side balls and a revolution period of smaller diameter-side balls is smaller as compared with a conventional bearing. The relation, $(\beta-10) \leq \alpha < \beta$, is established, where $\alpha(°)$ represents a contact angle of the larger diameter-side ball, and $\beta(°)$ represents a contact angle of the smaller diameter-side ball.

4 Claims, 3 Drawing Sheets

US 7,909,515 B2

DOUBLE ROW BALL BEARING AND DIFFERENTIAL GEAR DEVICE

BACKGROUND OF THE INVENTION

1. Field of the Invention

This invention relates to a double row ball bearing, and more particularly to a double row ball bearing (called a tandem type) which can suitably support a pinion shaft, for example, of a final reduction gear of an automobile, and is lubricated by lubricating oil received within the final reduction gear.

2. Related Art

Tandem type double row ball bearings which include a plurality of balls arranged in two rows between an outer ring and an inner ring, and a cage holding these balls have been extensively used in a pinion shaft support apparatus for a vehicle, etc., as shown in JP-A-2006-234100.

FIG. 3 shows a differential gear device which is one example of apparatus in which a double row ball bearing of the present invention can be used. The differential gear includes a pinion shaft 42 rotatably supported on a housing 41 and having a pinion gear 43 provided at a rear end thereof, a ring gear 44 meshing with the pinion gear 43, a pair of inner and outer double row ball bearings 45 and 46 rotatably supporting the pinion shaft 42 on the housing 41, and a drive shaft-connecting flange coupling 47 formed at an outer end of the pinion shaft 42.

In this differential gear, lubricating oil splashed up in accordance with the rotation of the ring gear 44 flows through a lubricating oil passageway 48 within the housing 41, and is introduced into a region between the pair of double row ball bearings 45 and 46. With respect to a supporting structure of the pinion shaft 43 and with respect to an oil supply from the oil passageway 48, one 45 of the double row ball bearings is located on a side of the pinion gear 43, while the other 46 of the double row ball bearings is located on a side opposite to the pinion gear 43. When the double row ball bearings 45 and 46 rotate, a flow of the fluid (a pumping action) from a smaller-diameter side of each bearing toward a larger-diameter side thereof occurs. Therefore, the double row ball bearings 45 and 46 used in the differential gear device are arranged such that their smaller-diameter sides are opposed to each other in an axial direction, and the lubricating oil is supplied from the smaller-diameter side of each bearing (that is, from the region between the pair of double row ball bearings 45 and 46) and is discharged from the larger-diameter side, utilizing this pumping action. This lubricating method is commonly used.

In a pinion shaft support apparatus of a vehicle, etc., to reduce a running torque of a bearing in order to achieve a low-loss design has been a problem. For reducing the running torque, it is effective to suppress an oil agitation loss caused by the lubricating oil.

SUMMARY OF THE INVENTION

It is an object of this invention to provide a double row ball bearing device in which a flow of lubricating oil in the bearing is rectified, thereby enabling a low-torque design.

According to the present invention, there is provided a double row ball bearing comprising:

an outer ring having a larger-diameter raceway surface and a smaller-diameter raceway;

an inner ring having a larger-diameter raceway surface and a smaller-diameter raceway surface corresponding respectively to said larger-diameter and smaller-diameter raceway surfaces of said outer ring;

a row of larger diameter-side balls disposed between said larger-diameter raceway surface of said outer ring and said larger-diameter raceway surface of said inner ring;

a row of smaller diameter-side balls which are disposed between said smaller-diameter raceway surface of said outer ring and said smaller-diameter raceway surface of said inner ring and have a pitch circle diameter smaller than a pitch circle diameter of said larger diameter-side balls;

a larger-diameter cage holding said row of larger diameter-side balls; and a smaller-diameter cage holding said row of smaller diameter-side balls, wherein a difference between a revolution period of said larger diameter-side balls and a revolution period of said smaller diameter-side balls is smaller than a difference between the revolution period of the larger diameter-side balls and the revolution period of the smaller diameter-side balls which would be obtained if the larger diameter-side ball and the smaller-diameter side ball are equal in diameter and contact angle to each other.

The difference between the revolution period of the larger diameter-side balls and the revolution period of the smaller diameter-side balls can be made small, for example, by increasing the diameter of the larger diameter-side balls while the diameter and contact angle of the smaller diameter-side balls and the pitch circle diameters of the two rows of balls are kept the same as those of a conventional bearing. Additionally, it is preferred to decrease the contact angle of the larger diameter-side balls. This can also be achieved merely by making the contact angle of the larger diameter-side balls smaller than the contact angle of the smaller diameter-side balls while keeping the diameter of the larger diameter-side balls equal to the diameter of the smaller diameter-side balls. When the contact angle is increased, a differential slip (spin) at an area of contact between the ball and the raceway surface increases, and the revolution speed decreases. Therefore, merely by changing the contact angle, the revolution period can be adjusted. Furthermore, the diameter of the smaller diameter-side balls may be decreased (in which case the number of the balls increases), and also the contact angle of the smaller diameter-side balls may be increased. Furthermore, the difference in pitch circle diameter between the row of larger diameter-side balls and the row of smaller diameter-side balls may be slightly reduced.

Preferably, the contact angles are so determined that the relation, $(\beta-10) \leq \alpha < \beta$, is established where $\alpha(°)$ represents the contact angle of the larger diameter-side ball, and $\beta(°)$ represents the contact angle of the smaller diameter-side ball. When $\alpha=(\beta-5)$ is established, an axial rigidity of the large diameter-side balls is generally equal to an axial rigidity of the small diameter-side balls, and the life of the large diameter-side balls used under a large axial load can be prevented from being shortened. For preventing the shortened life of the large diameter-side balls used in such a large axial load, it is also effective to make a curvature of the larger-diameter raceway larger than a curvature of the smaller-diameter raceway.

In case the difference in revolution period between the larger diameter side and the smaller diameter-side is large, a flow of lubricating oil at the larger-diameter side and a flow of lubricating oil at the smaller-diameter side interfere with each other within the bearing, so that the flow becomes complicated, thereby increasing a bearing torque. By synchronizing the two revolution periods with each other, the flow of the lubricating oil in the bearing can be rectified, so that the running torque of the bearing can be reduced.

More preferably, in order to secure the flow of the lubricating oil from the smaller-diameter side to the larger-diameter side, the pitch circle diameter of the larger diameter-side balls is made larger than the pitch circle diameter of the smaller diameter-side balls, and the two revolution periods are made equal to each other. By doing so, the flow of the lubricating oil in the bearing can be optimized so as to reduce the running torque, and besides the two cages used respectively at the larger-diameter side and the smaller-diameter side can be replaced by a single cage, and therefore the number of the component parts can be reduced.

In the double row ball bearing of the present invention, the difference between the revolution period of the larger diameter-side balls and the revolution period of the smaller diameter-side balls is small, and therefore the flow of the lubricating oil in the bearing can be rectified, thereby enabling the low-torque design.

DETAILED DESCRIPTION OF THE PREFERRED EMBODIMENTS

Preferred embodiments of the present invention will now be described with reference to the drawings.

Figure 1:
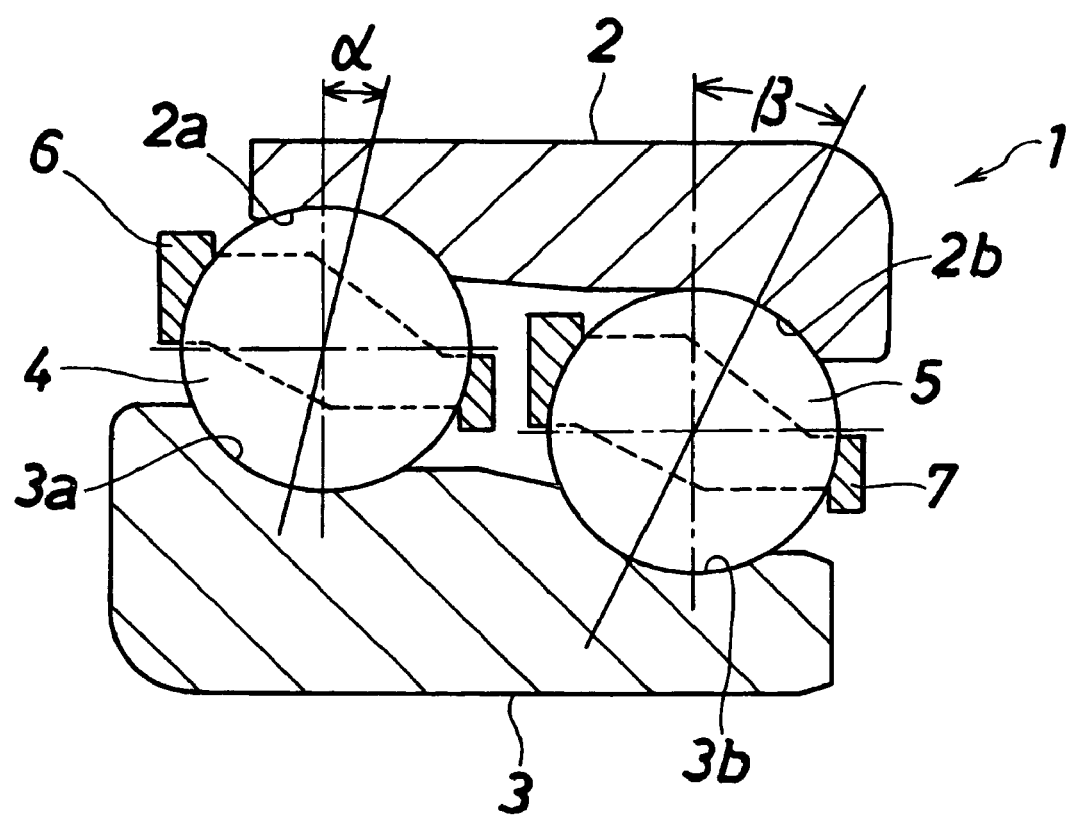
FIG. 1 is a longitudinal cross-sectional view showing an upper portion of a first embodiment of a double row ball bearing of the present invention.

FIG. 1 shows a first embodiment of a double row ball bearing of the present invention. This double row ball bearing 1 comprises an outer ring 2 which has two raceway surfaces 2a and 2b different in diameter from each other and is adapted to be mounted on a housing (not shown), an inner ring 3 which has two raceway surfaces 3a and 3b corresponding respectively to the raceway surfaces 2a and 2b of the outer ring 2 and is adapted to be mounted on a rotation shaft (not shown), a row of larger diameter-side balls 4 disposed between the raceway surface 2a of the outer ring 2 and the raceway surface 3a of the inner ring 3, a row of smaller diameter-side balls 5 which are disposed between the raceway surface 2b of the outer ring 2 and the raceway surface 3b of the inner ring 3 and have a pitch circle diameter smaller than a pitch circle diameter of the larger diameter-side balls 4, a larger-diameter cage 6 holding the row of larger diameter-side balls 4, and a smaller-diameter cage 7 holding the row of smaller diameter-side balls 5.

In FIG. 1, an outer diameter of the right raceway surface 3b of the inner ring 3 is smaller than an outer diameter of the left raceway surface 3a of the inner ring 3, and an inner diameter of the right raceway surface 2b of the outer ring 2 is smaller than an inner diameter of the left raceway surface 2a of the outer ring 2. A contact angle of each larger diameter-side ball 4 and a contact angle of each smaller diameter side-ball 5 are generally in the same direction (These contact angles are not limited to the same angle.). Each of the cages 6 and 7 is formed into a tapered shaped as a whole such that its diameter is increasing gradually from the right side toward the left side. Lubricating oil is supplied to the right side (FIG. 1) (that is, the smaller-diameter side), and is discharged from the left side (in FIG. 1) (that is, the larger-diameter side) by a pumping action of the double row ball bearing 1.

In a conventional double row ball bearing called a tandem type in which a pitch circle diameter of larger diameter-side balls is larger than a pitch circle diameter of smaller diameter-side balls, a diameter and a contact angle of each larger diameter-side ball are equal respectively to a diameter and a contact angle of each smaller diameter-side ball, and a revolution period of the larger diameter-side balls is larger than a revolution period of the smaller diameter-side balls. When the difference in revolution period between the larger-diameter side and the smaller-diameter side is large, a flow of lubricating oil at the larger-diameter side and a flow of lubricating oil at the smaller-diameter side interfere with each other, so that the flow becomes complicated, thereby increasing a bearing torque.

In the double row ball bearing 1 of this invention, attention is directed to the difference between the two revolution periods, and the flow of the lubricating oil in the bearing 1 is rectified by lessening this difference to thereby enable the reduction of the running torque, and the contact angle of the larger diameter-side balls 4 is made smaller than the contact angle of the smaller diameter-side balls 5 without changing the pitch circle diameter so that the difference of the revolution period of the larger diameter-side balls 4 and the revolution period of the smaller diameter-side balls 5 can be made smaller as compared with the conventional bearing. At the smaller-diameter side where the contact angle is relatively large, a differential slip (spin) at an area of contact between each smaller diameter-side ball 5 and the raceway surface increases, and the revolution speed decreases, and therefore the revolution period of the smaller diameter-side balls 5 becomes large, and becomes close to the revolution period of the larger diameter-side balls 4. Incidentally, the contact angles are so determined that the following relation is established:

$(\beta-10) \leqq \alpha < \beta$ where $\alpha(°)$ represents the contact angle of the larger diameter-side balls 4, and $\beta(°)$ represents the contact angle of the smaller diameter-side balls 5.

Figure 2:
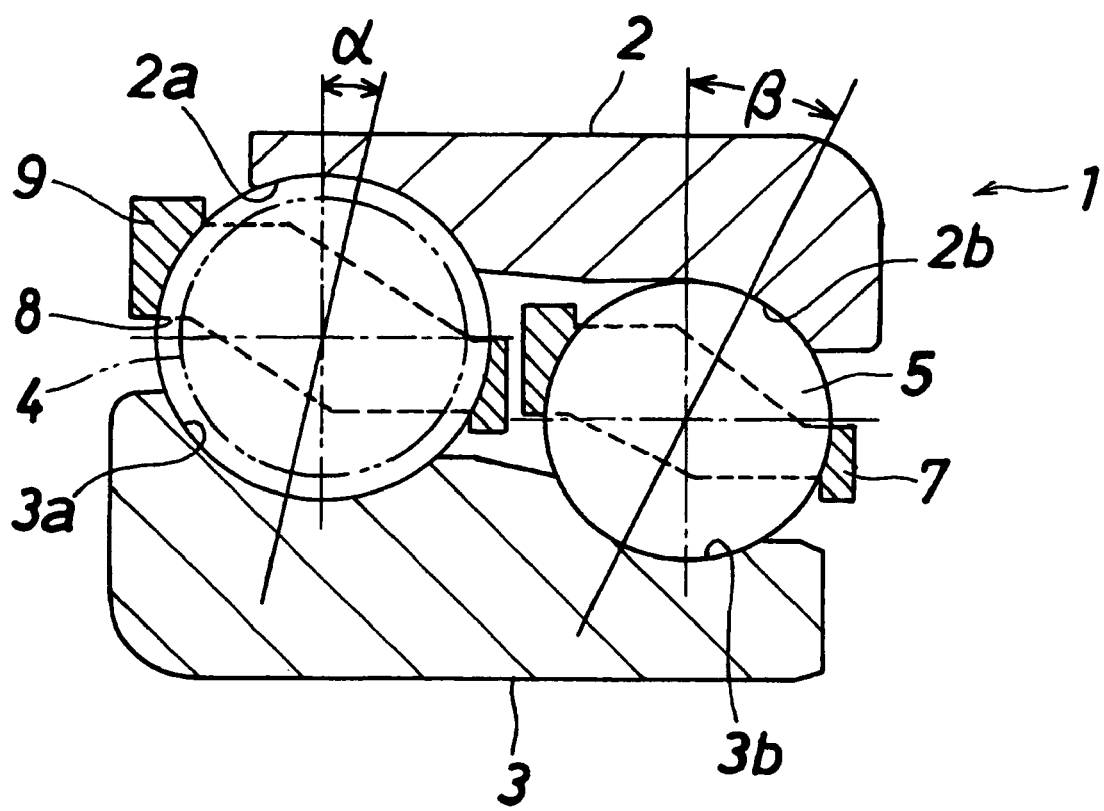
FIG. 2 is a longitudinal cross-sectional view showing an upper portion of a second embodiment of a double row ball bearing of the invention.

FIG. 2 shows a second embodiment of a double row ball bearing of the invention. This second embodiment is identical to the first embodiment in that a contact angle of each larger diameter-side ball 8 is smaller than a contact angle of each smaller diameter-side ball 5, and differs from the first embodiment that a diameter of each larger diameter-side ball 8 is larger than a diameter of each smaller diameter-side ball 5 (that is, the diameter of the larger diameter-side ball 4 of the first embodiment as indicated in a dots-and-dash line in FIG. 2). In the second embodiment, the revolution period of the larger diameter-side balls 8 is further shortened, and the difference of the revolution period of the larger diameter-side ball 8 and the smaller diameter-side ball 5 is further lessened.

Figure 3:
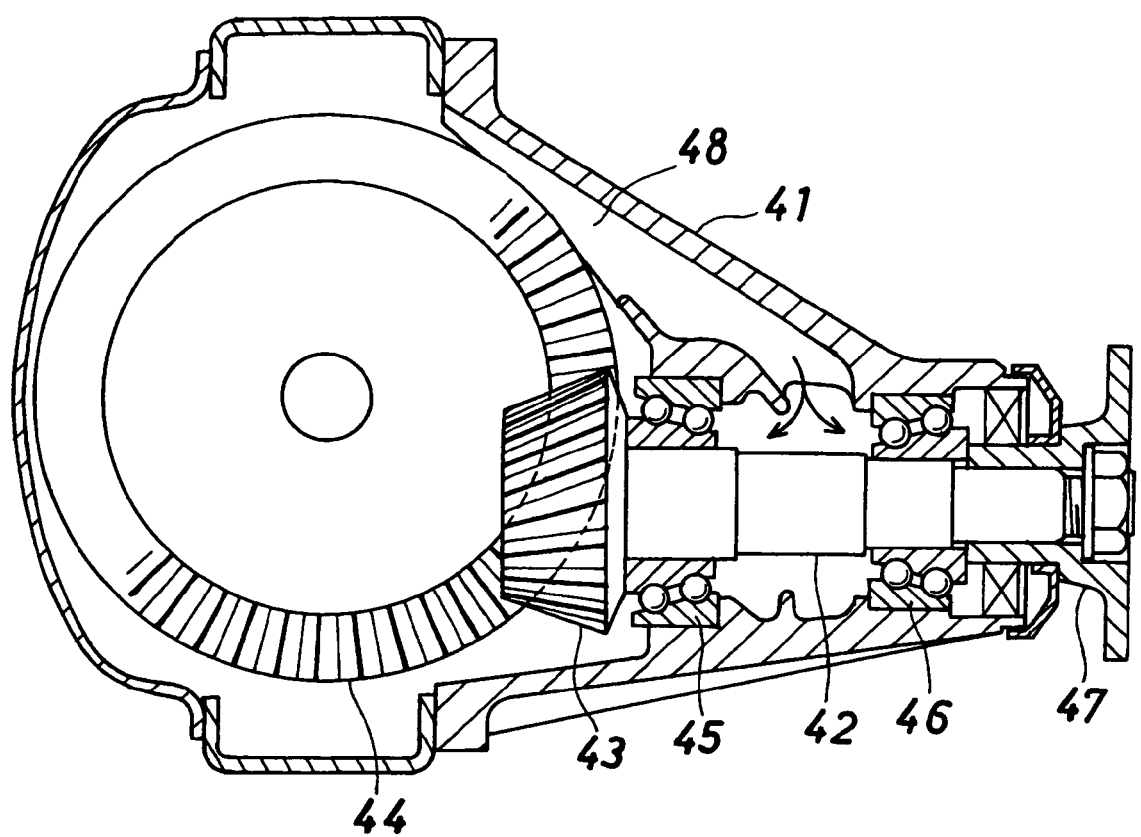
FIG. 3 is a longitudinal cross-sectional view of a differential gear which is one example of apparatus in which the double row ball bearings of the invention can be used.

Each of the double row ball bearings 1 shown in FIGS. 1 and 2 can be suitably used as the bearings for rotatably supporting the pinion shaft 42 on the housing 41 in the differential gear of the automobile shown in FIG. 3. The double row ball bearing 1 is lubricated by lubricating oil received within the housing 41. When a flow of the lubricating oil in the bearing 1 is disturbed, the running torque increases. However, in the double row ball bearings 1 of the invention, the difference between the revolution period of the larger diameter-side balls 4, 8 and the revolution period of the smaller diameter-side balls 5 is smaller as compared with the conventional bearing, and therefore the disturbance of the flow of the lubricating oil is suppressed, thereby enabling the low-torque design.

The double row ball bearings 1 of the invention can support the pinion shaft (rotation shaft) of the differential gear, and also can be used for supporting any other rotation shaft such for example as a pinion shaft of a transaxle apparatus.

What is claimed is:

1. A double row ball bearing comprising:
   an outer ring having a larger-diameter raceway surface and a smaller-diameter raceway;
   an inner ring comprising a larger-diameter raceway surface and a smaller-diameter raceway surface corresponding respectively to said larger-diameter and smaller-diameter raceway surfaces of said outer ring;
   a row of larger diameter-side balls disposed between said larger-diameter raceway surface of said outer ring and said larger-diameter raceway surface of said inner ring;
   a row of smaller diameter-side balls which are disposed between said smaller-diameter raceway surface of said outer ring and said smaller-diameter raceway surface of said inner ring and comprise a pitch circle diameter smaller than a pitch circle diameter of said larger diameter-side balls;
   a larger-diameter cage holding said row of larger diameter-side balls; and
   a smaller-diameter cage holding said row of smaller diameter-side balls,
   wherein a difference between a revolution period of said larger diameter-side balls and a revolution period of said smaller diameter-side balls is smaller than a difference between the revolution period of the larger diameter-side balls and the revolution period of the smaller diameter-side balls which would be obtained if the larger diameter-side ball and the smaller-diameter side ball are equal in diameter and contact angle to each other, and
   wherein the revolution period of said larger diameter-side balls is substantially equal to the revolution period of said smaller diameter-side balls.

2. A double row ball bearing according to claim 1, wherein the relation, $(\beta-10) \leq \alpha < \beta$, is established, where $\alpha(°)$ represents the contact angle of said larger diameter-side ball, and $\beta(°)$ represents the contact angle of said smaller diameter-side ball.

3. A double row ball bearing according to claim 2, wherein the diameter of said larger diameter-side ball is larger than the diameter of said smaller-diameter side ball.

4. A differential gear device comprising:
   a housing;
   a pinion shaft rotatably supported on the housing and having a pinion gear provided at a rear end thereof;
   a ring gear meshing with the pinion gear; and
   a pair of double row ball bearings rotatably supporting the pinion shaft on the housing, one of said pair of double row ball bearings being located on a side of the pinion gear and the other of said pair of double row bearings being located on a side opposite to the pinion gear,
   wherein at least one of said pair of double row ball bearings is provided with a double row ball bearing according to claim 1.

* * * * *